March 3, 1970  P. C. TABOR  3,498,669
SEAT BACK CONSTRUCTION
Filed March 5, 1968

INVENTOR.
PAUL C. TABOR
BY
*A. L. Truax Jr.*
ATTORNEY

United States Patent Office 3,498,669
Patented Mar. 3, 1970

3,498,669
SEAT BACK CONSTRUCTION
Paul C. Tabor, Clawson, Mich., assignor, by mesne assignments, to The Budd Company, Philadelphia, Pa., a corporation of Pennsylvania
Filed Mar. 5, 1968, Ser. No. 710,541
Int. Cl. A47c 7/42
U.S. Cl. 297—396    5 Claims

ABSTRACT OF THE DISCLOSURE

A headrest integrally built into a seat back wherein a formed piece of sheet metal serves a dual purpose of providing a resilient support for the headrest and forming a box section for joining two upright frame members at the top to complete the rigid seat back frame portion of the seat.

---

This invention relates to seat structures and more particularly to the headrest portion of a seat assembly.

Generally vehicle seat structures have a rectangular frame formed from tubular or channel sections with sinuous formed wires extending between opposite sides of the rectangular frame to form a loading platform. To provide more resilience and a softer edge structure V or W formed wire fish mouth shapes space the load platform from the rigid frame.

It is an object of this invention to provide a formed sheet metal panel for a seat back in which the sheet metal panel performs the dual function of providing a side member of the frame of the seat back combined with providing a resilient end support portion for the headrest of the seat back.

This and other objects of this invention will be seen as reference is made to the accompanying specification and drawings wherein.

Figure 1:
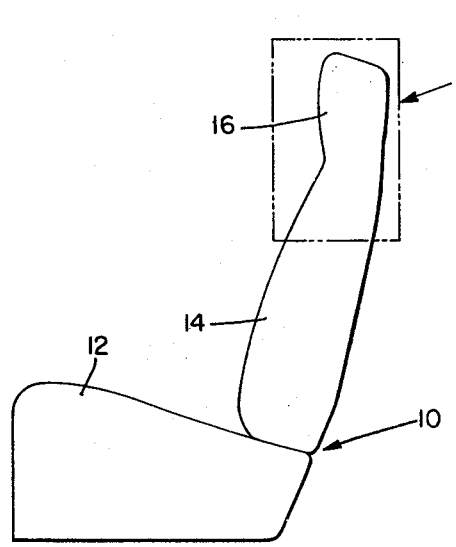
FIG. 1 shows a vehicle seat utilizing the present invention.

Referring now to the drawings, as seen in FIG. 1, a vehicle seating unit 10 including a seat bottom 12 and a seat back 14 is shown. Conventional means for mounting the seat unit in a vehicle are provided but not shown. The headrest portion 16 of the seat back 14 is shown in enlarged section in FIGS. 2 and 3.

Figure 2:
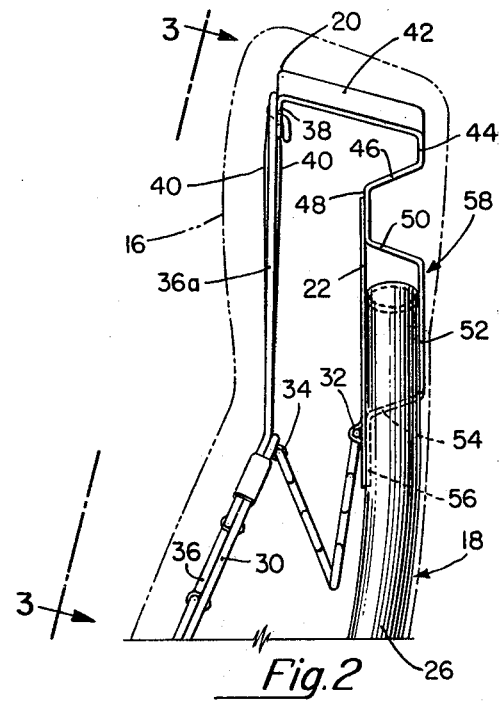
FIG. 2 is an enlarged sectional view of the headrest section outlined in phantom lines in FIG. 1 and illustrating the manner in which the formed sheet metal headrest support is joined to the tubular seat frame and formed wire springs.
Figure 3:
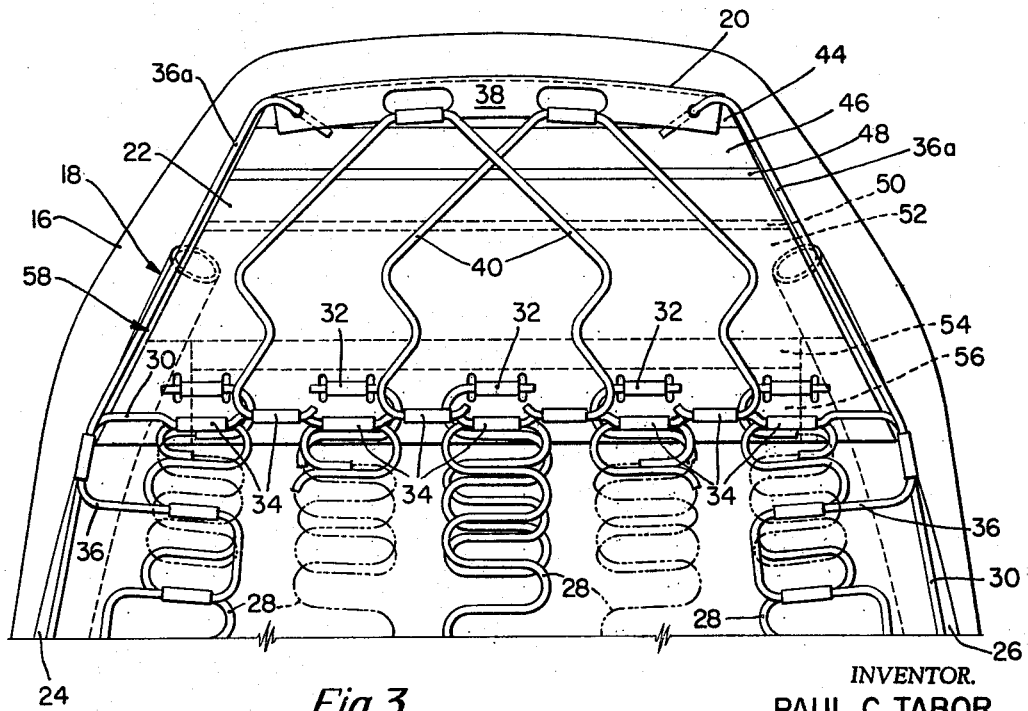
FIG. 3 is a view in the direction of the arrows 3—3 of FIG. 2 showing the formed wire load platform and support springs of this invention.

Referring now to FIGS. 2 and 3, the tubular seat back frame 18 extends up each side of the seat back 14 and is joined to the formed sheet metal headrest support 20 by welding or other suitable means. A reinforcing spring mounting plate 22 is joined to the side members 24, 26 of the seat back frame 18 and to the headrest support 20 by welding or other suitable means for providing a rigid box section 58 to help support the resilient headrest portion on the seat back frame and the box section formed by the plate 22 and support 20 provides the top portion of the seat back frame by extending between the two tubular side frame members 24, 26.

The seat back 14 is generally of conventional construction having sinuous zig-zag springs 28 extending vertically in the plane of the loading platform of the seat back. The zig-zag springs 28 are secured to the seat back frame 18 and to a border wire 30 by conventional spring attaching means 32 and clips 34 respectively. An edge reinforcing wire 36 extends between and is secured to the border wire 30 and the outer zig-zag springs 28 in a conventional manner. The upper end 36a of edge wire 36 extends above the seat back 14 and is anchored in an aperture of a downwardly depending flange 38 of the head rest support 20 to form a border wire for the headrest 16.

A support platform for the headrest is formed by a pair of modified inverter V-shaped formed wires 40 having their apexes secured to flange 38 in a conventional manner and each of the legs is secured by a clip 34 to the border wire 30.

The headrest support 20 has the depending downwardly direct flange 38 substantially in the plane of the headrest support platform formed by the V-shaped wires 40 and border wires 36a. The formed sheet metal headrest support 20 extends rearwardly of the depending flange 38 in a reversed block "S" shape formed by the sections 42, 44, 46, 48 and 50, as best seen in FIG. 2. From section 50, the support extends downwardly as an "N" shape formed by sections 52, 54 and 56.

The vertical section 52 is secured to the back of the upright tubular side frames 24, 26 and the sections 48 and 56 are secured to the reinforcing plate 22. Thus, with the reinforcing plate 22 secured to sections 48 and 56, the box section 58 consisting of plate 22 and sections 50, 52 and 54 is positioned between and secured to the frame members 24 and 26 for completing the upper portion of the rectanglular frame 18.

The sections 46, 44, 42 and the depending flange 20 are supported on the box section 58 for resiliently supporting loads placed on the headrest.

The padding and cover are placed over the seat structure in the usual manner to complete the seating unit.

When a seat back and headrest are formed as an integral unit, the seat frame is generally extended to include the headrest portion. In this novel headrest structure, a sheet metal extension 20 forms a resilient support for the headrest above the frame of the seat back and also is used to form the top of the seat back frame.

I claim:

1. In combination in a seating unit, a seat back having a forward facing supporting surface, said seat back including a rectangular frame having a pair of upright side members; a headrest extending above said seat back substantially in the plane thereof, said headrest having resilient support means for yieldably supporting said headrest on said seat back, said resilient support means includes a formed sheet metal support secured to and extending between and above said side members for forming a rigid top side of said rectangular frame, a reinforcing plate secured to said sheet metal support and said side members, said sheet metal support and said reinforcing plate forming a box structure between said side members for supplying structural rigidity and strength to said rectangular frame by forming the top side thereof, and spring means extending between said sheet metal support and said seat back for forming a support platform for said headrest whereby said headrest is integrally formed with said seat back.

2. The headrest as claimed in claim 1 wherein said seat back includes laterally extending zig-zag springs having each end thereof secured to said rectangular frame, and a border wire spaced from said frame and extending around said springs and connected thereto; said headrest spring means being connected to said border wire for presenting an integral support surface with said seat back.

3. The headrest as claimed in claim 2 including an edge wire secured to and interconnecting said zig-zag springs and said border wire, said edge wire extending above said seat back and being connected to said formed sheet metal support for forming a headrest border wire adjacent said headrest spring means.

4. In combination, a vehicle seat back including a generally rectangular frame having upright side members, a plurality of sinuous formed wire springs extending across said frame and secured thereto, a loading platform formed by said sinuous springs for supporting a load on said seat back, a border wire extending around said loading platform substantially in the plane of the loading platform and connected to said sinuous springs for securing said sinuous springs in a load supporting position, a reinforcing edge wire connected to and extending between said border wire and the adjacent sinuous springs for reinforcing the edge of said seat back; a headrest extending above said seat back; said headrest including a plurality of formed wire springs connected to and extending above said border wire for forming a headrest support platform, a resilient formed sheet metal support secured to and extending between said upright side members of said frame, a reinforcing plate secured to said sheet metal support and said upright side members, a box section formed by said reinforcing plate and said sheet metal support forming a cross member of said rectangular seat frame and support means for said headrest, said sheet metal support having a depending flange extending into the plane of said headrest support platform, said formed wire springs being connected to said depending flange for support thereon, said reinforcing edge wire extending above said seat back and being connected to said depending flange for forming a headrest border wire on the support platform of said headrest, and said sheet metal support resiliently supporting said headrest support platform during application of a load thereon.

5. In combination in a seating unit, a seat back having a forward facing supporting surface, said seat back including a rectangular frame having a pair of upright side members; a headrest extending above said seat back substantially in the plane thereof, said headrest having resilient support means for yieldably supporting said headrest on said seat back, said support means being attached to and extending between said side members for forming the top side of said rectangular frame, spring means extending between said support means and said seat back for forming a support platform for said headrest whereby said headrest is integrally formed with said seat back, said resilient support means includes a formed sheet metal support having a depending flange for being connected to said spring means, said sheet metal support extending rearwardly of said depending flange in a reversed block "S" shape, said sheet metal support continuing below said "S" shape in an "N" shape for attaching said sheet metal support to said side members on the rear side thereof and a reinforcing plate being joined to the front side of said side members and to said sheet metal support between the side members for forming a box structure between said side members for supplying structural rigidity and strength to said rectangular frame by forming the top side thereof.

References Cited

UNITED STATES PATENTS

| | | | |
|---|---|---|---|
| 2,292,597 | 8/1942 | Bartlett et al. | 297—396 X |
| 2,420,220 | 5/1947 | Bartlett et al. | 297—396 |
| 2,839,125 | 6/1958 | Brandon | 297—408 X |
| 3,264,382 | 8/1966 | Angell et al. | 297—396 X |

CASMIR A. NUNBERG, Primary Examiner

U.S. Cl. X.R.

297—459